United States Patent
Kari et al.

(10) Patent No.: US 9,560,183 B2
(45) Date of Patent: Jan. 31, 2017

(54) ACCESSORY DETECTION

(71) Applicant: Nokia Technologies Oy, Espoo (FI)

(72) Inventors: Juhani Kari, Lieto (FI); Timo Toivola, Turku (FI); Jari Kinanen, Salo (FI); Jukka Kontulainen, Salo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/767,940

(22) PCT Filed: Feb. 20, 2013

(86) PCT No.: PCT/FI2013/050191
§ 371 (c)(1),
(2) Date: Aug. 14, 2015

(87) PCT Pub. No.: WO2014/128338
PCT Pub. Date: Aug. 28, 2014

(65) Prior Publication Data
US 2015/0373180 A1    Dec. 24, 2015

(51) Int. Cl.
| | |
|---|---|
| *H04B 5/00* | (2006.01) |
| *H04M 1/725* | (2006.01) |
| *G06F 1/16* | (2006.01) |
| *G06F 1/26* | (2006.01) |
| *H02J 5/00* | (2016.01) |
| *H02J 7/02* | (2016.01) |
| *H02J 17/00* | (2006.01) |

(Continued)

(52) U.S. Cl.
CPC ........ *H04M 1/72527* (2013.01); *G06F 1/1626* (2013.01); *G06F 1/1632* (2013.01); *G06F 1/26* (2013.01); *H02J 5/005* (2013.01); *H02J 7/025* (2013.01); *H02J 7/04* (2013.01); *H02J 17/00* (2013.01); *H04B 1/3888* (2013.01); *H04M 1/72575* (2013.01); *G06F 2200/1633* (2013.01)

(58) Field of Classification Search
CPC .......................... H04W 4/008; H04B 5/0037
USPC ......... 455/41.1, 41.2, 39, 575.8, 573, 343.1; 320/108
See application file for complete search history.

(56) References Cited

U.S. PATENT DOCUMENTS 8,397,982 B2 *  3/2013  Slaby ................... G06F 1/1626
                                                        235/375
8,838,403 B2 *  9/2014  del Castillo ........... G01C 17/38
                                                        702/92

(Continued)

FOREIGN PATENT DOCUMENTS

| CN | 102272689 A | 12/2011 |
|---|---|---|
| CN | 102738530 A | 10/2012 |

(Continued)

OTHER PUBLICATIONS

Strommer, Esko, et al., "NFC-enabled Wireless Charging", 2012 4th International Workshop on Near Field Communication, © 2012 IEEE, 6 pgs.

(Continued)

*Primary Examiner* — Sonny Trinh
(74) *Attorney, Agent, or Firm* — Harrington & Smith (57) ABSTRACT

An apparatus including a processor configured to cause detecting a second apparatus including a wireless charging unit being attached to the apparatus; determining a parameter concerning the second apparatus; and automatically adjusting at least one functionality of the apparatus in accordance with the parameter.

20 Claims, 4 Drawing Sheets

(51) Int. Cl.
*H02J 7/04* (2006.01)
*H04B 1/3888* (2015.01)

(56) References Cited

U.S. PATENT DOCUMENTS

| | | | |
|---|---|---|---|
| 8,896,264 B2 * | 11/2014 | Partovi | H01F 7/0252 |
| | | | 320/108 |
| 2005/0149951 A1 | 7/2005 | Uola et al. | 719/328 |
| 2008/0258679 A1 | 10/2008 | Manico et al. | |
| 2010/0083012 A1 | 4/2010 | Corbridge et al. | 713/300 |
| 2010/0289448 A1 * | 11/2010 | Jung | H02J 7/025 |
| | | | 320/108 |
| 2012/0146576 A1 | 6/2012 | Partovi | |
| 2012/0153016 A1 | 6/2012 | Slaby et al. | 235/375 |
| 2013/0157565 A1 * | 6/2013 | Clement | H02J 7/0052 |
| | | | 455/41.1 |
| 2014/0308995 A1 * | 10/2014 | Wu | H02J 7/007 |
| | | | 455/573 |
| 2014/0308996 A1 * | 10/2014 | Byun | H02J 17/00 |
| | | | 455/573 |
| 2015/0050881 A1 * | 2/2015 | Chen | H04W 52/0296 |
| | | | 455/41.1 |

FOREIGN PATENT DOCUMENTS

| | | |
|---|---|---|
| JP | 2007/232415 A | 9/2007 |
| JP | 2011/030404 A | 2/2011 |
| JP | 2012/257044 A | 12/2012 |
| WO | WO 2007/053329 A1 | 5/2007 |
| WO | WO 2012/156783 A1 | 11/2012 |

OTHER PUBLICATIONS

Supplementary European Search Report dated Nov. 7, 2016, in EP Application No. 13 87 5568, 7 pgs.

Japanese Office Action dated Nov. 15, 2016 in Japanese Patent Application No. 2015-558514, 4 pgs.

* cited by examiner

ACCESSORY DETECTION

TECHNICAL FIELD

The present invention generally relates to portable electronic devices and accessories thereof. More particularly, though not exclusively, the invention relates to covers for wireless charging of portable electronic devices.

BACKGROUND ART

Portable electronic devices, e.g. mobile phones, smartphones and tablets, are widely used for different purposes, and there is a wide variety of accessories available for such devices. Accessories serve several purposes, ranging from protecting the device to adding functionality to the device.

A common accessory to a portable electronic device is a cover or case that protects the device or offers further functionality thereto. For example covers implementing wireless charging of the device are increasingly popular. A suitable cover with or without further functionality provides a further enhancement of the user experience while retaining the outstanding qualities and functionality of the device itself.

SUMMARY

According to a first example aspect of the invention there is provided an apparatus comprising:
  a processor configured to cause
    detecting a second apparatus comprising a wireless charging unit being attached to the apparatus;
    determining a parameter concerning the second apparatus; and
    automatically adjusting at least one functionality of the apparatus in accordance with the parameter.

The adjusting may comprise normalizing the functioning of the apparatus.

Detecting the second apparatus may comprise detecting a change of orientation of the second apparatus.

The apparatus may further comprise a magnetometer; and the adjusting may comprise adjusting the magnetometer.

The apparatus may further comprise an antenna; and the adjusting may comprise tuning the antenna.

The apparatus may further comprise a speaker; and the adjusting may comprise adjusting the speaker.

The detecting may comprise receiving the parameter from the second apparatus.

The detecting may comprise receiving measurement information from a measurement unit.

The detecting may comprise detecting an electrical quantity.

The detecting may comprise reading a code.

The detecting may comprise detecting an element in the second apparatus.

The determining may comprises retrieving the parameter from a memory.

The determining may comprise retrieving from a memory, information on where to retrieve the parameter.

The determining may comprise self-calibration.

The determining may further comprise adjusting the parameter based on measurement data.

The apparatus may comprise a mobile phone, a smartphone, a tablet computer or an e-book reader.

According to a second example aspect of the invention there is provided an apparatus comprising:
  a memory; and
  a wireless charging unit; wherein
    said memory comprises a parameter concerning the apparatus; and
    said apparatus is configured to be attached to a first apparatus according to the first example aspect of the invention.

The apparatus may further comprise a processor.

The processor may be configured to send the parameter to the first apparatus according to the first example aspect of the invention.

The wireless charging unit may comprises a coil and a shield.

The apparatus may further comprise a connection unit configured to connect the apparatus to a first apparatus according to the first example aspect of the invention.

The apparatus may comprise a cover, a case, a skin or a foil.

According to a third example aspect of the invention there is provided a system comprising
  the first apparatus according to the first example aspect of the invention; and
  the second apparatus according to the second example aspect of the invention.

According to a fourth example aspect of the invention there is provided a method comprising:
  detecting a second apparatus comprising a wireless charging unit being attached to a first apparatus;
  determining a parameter concerning the second apparatus; and
  automatically adjusting at least one functionality of the first apparatus in accordance with the parameter.

The adjusting may comprise normalizing the functioning of the apparatus.

Detecting the second apparatus may comprise detecting a change of orientation of the second apparatus.

The adjusting may comprise adjusting a magnetometer of the first apparatus.

The adjusting may comprise tuning an antenna of the first apparatus.

The adjusting may comprise adjusting a speaker of the first apparatus.

The detecting may comprises receiving the parameter from the second apparatus.

The detecting may comprise receiving measurement information from a measurement unit.

The detecting may comprise detecting an electrical quantity.

The detecting may comprise reading a code.

The detecting may comprise detecting an element comprised in the second apparatus.

The determining may comprise retrieving the parameter from a memory.

The determining may comprise retrieving information from a memory on where to retrieve the parameter.

The determining may comprise self-calibration.

The determining may further comprise adjusting the parameter based on measurement data.

The first apparatus may comprise a mobile phone, a smartphone, a tablet computer or an e-book reader.

The method may further comprise attaching and/or pairing the second apparatus to the first apparatus.

The second apparatus may comprise a cover, a case, a skin or a foil.

According to a fifth example aspect of the invention there is provided computer program product comprising computer code for causing performing the method of the fourth example aspect of the invention, when executed by an apparatus.

According to a sixth example aspect of the invention there is provided a memory medium comprising the computer program of the seventh example aspect of the invention.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

Some example embodiments of the present invention and potential advantages are understood by referring to FIGS. 1a through 5 of the drawings.

Figure 1A:
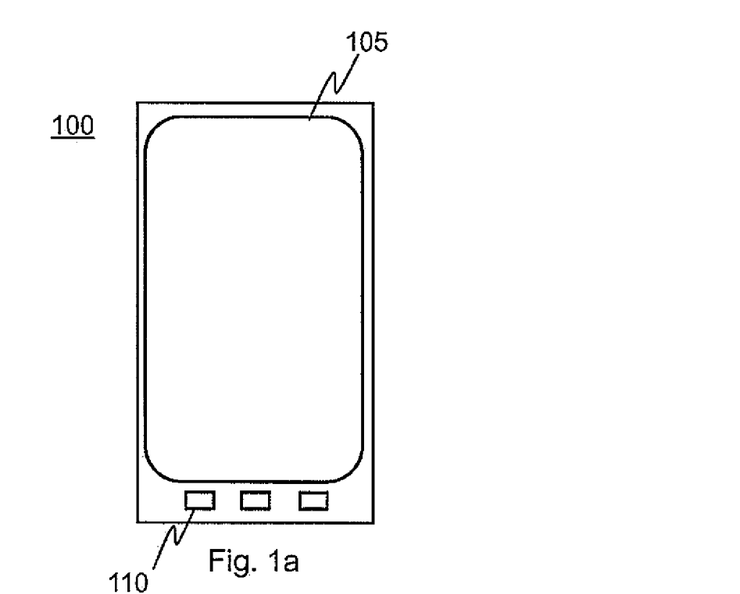
FIG. 1a shows a schematic front view of a first apparatus according to an example embodiment of the invention.

FIG. 1a shows a schematic front view of a first apparatus 100 according to an example embodiment of the invention. The first apparatus 100 is for example a mobile phone, a smartphone, a tablet computer or an e-book reader and/or other electronic device. The first apparatus 100 comprises a display 105 and user interface elements 110. In an example embodiment, the display 105 is a touch sensitive display. The touch sensitive display 105 comprises, in an example embodiment, a touch sensor for detecting the touch of the user on or in proximity thereof. In an example embodiment, the touch sensor comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof. In a further example embodiment, the first apparatus 100 comprises, in addition to the user interface elements 110, further user interface elements such as hardware or soft buttons or further display units. Furthermore, the first apparatus 100, in a further example embodiment, comprises further elements (not shown), such as microphones, speakers, sensors or detectors and/or camera units.

Figure 1B:
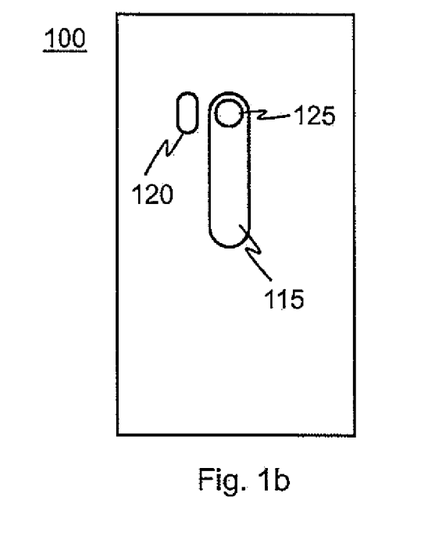
FIG. 1b shows a schematic back view of a first apparatus according to an example embodiment of the invention.

FIG. 1b shows a schematic back view of the first apparatus 100 according to an example embodiment of the invention. In an example embodiment the apparatus comprises a lens 125 of a camera unit, a flash element 120, such as a led and/or xenon flash, and/or a decorative or protective element 115. Furthermore, the first apparatus 100, in a further example embodiment, comprises further elements that are not shown.

Figure 1C:
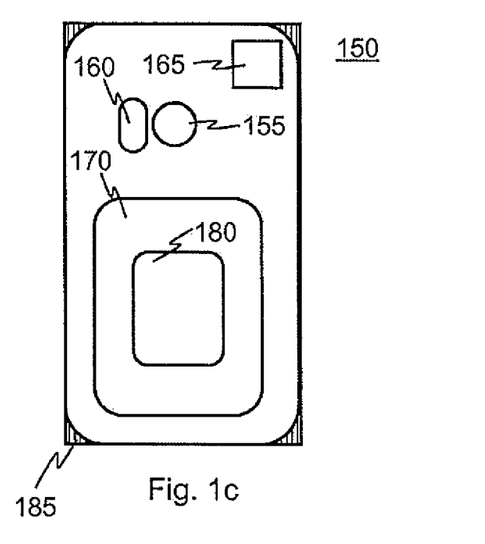
FIG. 1c shows a schematic view of a second apparatus according to an example embodiment of the invention.

FIG. 1c shows a schematic view of a second apparatus 150 according to an example embodiment of the invention. The second apparatus 150 is for example an accessory to the first apparatus 100, such as a cover, a casing, a case, a skin or a foil and/or other accessory. The second apparatus 150 is configured to be attached to, for example placed on or around, the first apparatus 100 for example by snapping-on, by sliding over, magnetically, mechanically or by stretching over. In an example embodiment, the second apparatus 150 comprises elements configured to attach, lock, fix or fasten the second apparatus 150 on or around the first apparatus 100, such as elements 185 configured to form-fit around the corners of the first apparatus 100. In a further example embodiment, other convenient fixing means, such as elastic or stretchable material is used.

In an example embodiment the second apparatus 150 comprises holes or extrusions oriented with the elements of the first apparatus 100, such as a hole 155 for the lens 125 and a hole 160 for the flash element 120. In a further example embodiment, the second apparatus 150 comprises a wireless charging coil 180 and a shield element 170, e.g. a ferrite shield. In a further example embodiment, the second apparatus 150 comprises further elements 165, such as sensors or detectors, communication units, user interface elements or detectable elements as described in more detail hereinafter.

Figure 2A:
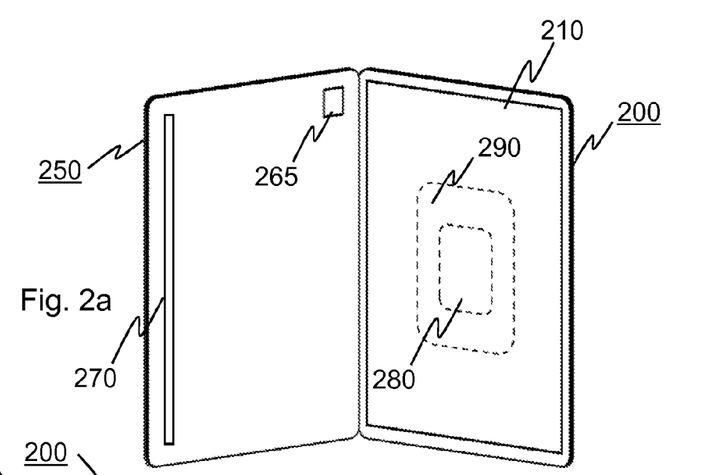
FIG. 2a shows a schematic view of a system comprising a first and a second apparatus according to an example embodiment of the invention.

FIG. 2a shows a schematic view of a system comprising an apparatus according to an example embodiment of the invention. In an example embodiment, the system comprises a first apparatus 200 and a second apparatus 250. The first apparatus 200 is for example a mobile phone, a smartphone, a tablet computer, an e-book reader and/or other electronic device. The first apparatus 200 comprises a display 210. In an example embodiment, the display 210 is a touch sensitive display. The touch sensitive display 210 comprises, in an example embodiment, a touch sensor for detecting the touch of the user on or in proximity thereof. In an example embodiment, the touch sensor comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof. In a further example embodiment, the second apparatus 250 comprises further elements 265, such as sensors or detectors, communication units, or detectable elements as described in more detail hereinafter. In a further example embodiment, the second apparatus 250 comprises user interface elements 270 such as a keyboard, hardware or software buttons, touch sensitive displays or surfaces, slider controls or switches. Furthermore, the first apparatus 200 comprises, in a further example embodiment, further elements (not shown), such as further user interface elements, microphones, speakers, sensors or detectors and/or camera units.

The second apparatus 250 is for example an accessory to the apparatus 100, such as a cover, a casing, a case, a skin or a foil and/or other accessory. In an example embodiment, the second apparatus 250, or a part thereof, is configured to be placed on or around the first apparatus 200 for example by snapping-on, by sliding over, magnetically, mechanically, or by stretching over. In an example embodiment, the second apparatus 250 comprises elements (not shown) configured to attach, lock, fix or fasten the second apparatus 250 on or around the first apparatus 200. In a further example embodiment, the second apparatus 250 comprises a part that is configured to be attached to, or placed on or around, the second apparatus 250 and a part that is configured to be folded or draped or bent on or around the apparatus in a closed configuration and configured to be folded, draped or bent to different open orientations, configurations or positions. In the open configurations, the second apparatus 250 is configured to support the first apparatus 200 in different orientations and/or to allow access to the touch sensitive display 210 and or to the user interface elements 270. In a further example embodiment, the second apparatus 250 comprises, for example on the backside thereof, a wireless charging coil 280 and a shield element 290, e.g. a ferrite shield.

Figures 2B, 2C, 2D:
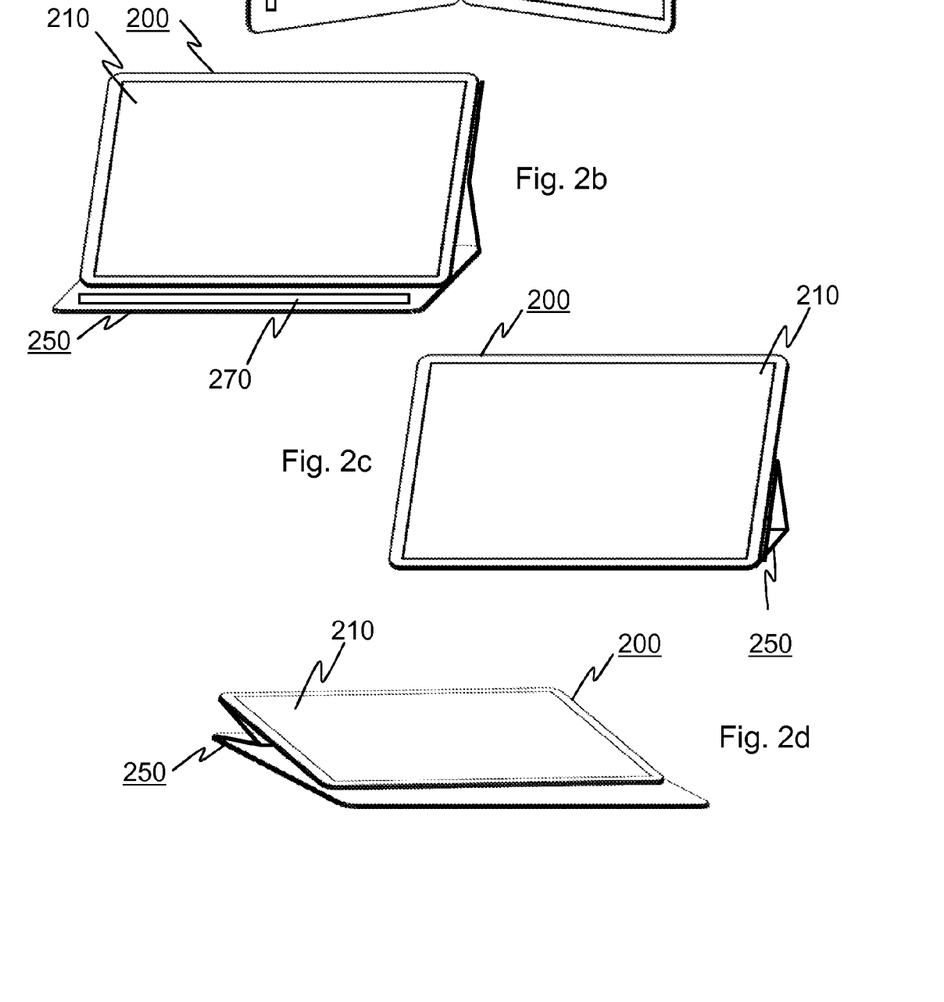
FIG. 2b shows a schematic view of a system comprising a first and a second apparatus according to an example embodiment of the invention.
FIG. 2c shows a schematic view of a system comprising a first and a second apparatus according to an example embodiment of the invention.
FIG. 2d shows a schematic view of a system comprising a first and a second apparatus according to an example embodiment of the invention.

FIG. 2a shows a schematic view of a system comprising an apparatus according to an example embodiment of the invention, wherein the second apparatus 250 is in an open configuration, i.e. the system comprising the first apparatus 200 and second apparatus 250 is opened in a book-like manner. FIGS. 2b-2d show further schematic views of a system comprising an apparatus according to an example embodiment of the invention, wherein the first apparatus 200 is supported in different orientations by folding, bending or draping the second apparatus 250 in different open configurations.

Figure 3:
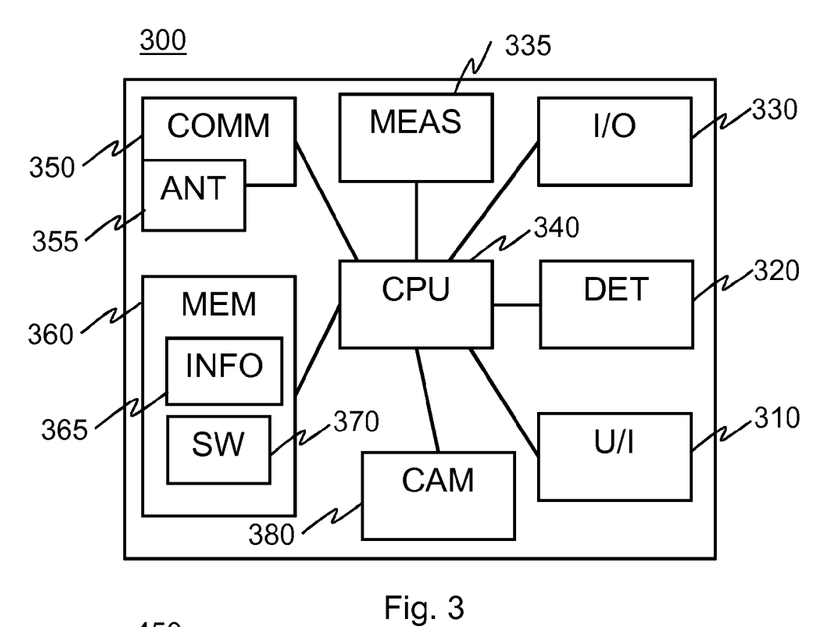
FIG. 3 shows a schematic block diagram of a first apparatus according to an example embodiment of the invention.

FIG. 3 shows a schematic a block diagram of a first apparatus 300 of an example embodiment. The first apparatus 300 is suited for operating as the first apparatus 100,200. The first apparatus 300 comprises a communication interface module 350, with an antenna 355, a processor 340 coupled to the communication interface module 350, and a memory 360 coupled to the processor 340. The apparatus further comprises an input/output (I/O) unit 330, comprising for example an integrated hands free speaker (not shown), a user interface (U/I) unit 310, such as a touch sensitive display, and an accessory detection unit 320, which are coupled to the processor 340. In an example embodiment, the detection unit 320 is implemented either separately from the processor 340 or as an integral part thereof and/or that the detection unit is implemented with software and/or hardware. In a further example embodiment, the first apparatus 300 comprises coupled to the processor 340 a camera unit 380, and measurement unit 335, comprising e.g. a magnetometer, a gyroscope, an optical sensor, a magnetic sensor, a temperature sensor and/or an acceleration sensor. It should be noted, that the term sensor comprises detectors, transducers and further measurement circuitry or elements.

The memory 360 comprises a work memory and a non-volatile memory such as a read-only memory, flash memory, optical or magnetic memory. In the memory 360, typically at least initially in the non-volatile memory, there is stored software 370 operable to be loaded into and executed by the processor 340. The software 370 may comprise one or more software modules and can be in the form of a computer program product that is software stored in a memory medium. In an example embodiment, the memory 360 comprises data 365 on accessories that have been attached or used, are attached or can be attached, i.e. are compatible, with the first apparatus 300. The data 365 comprises for example a database or a look-up table. The data 365 comprises for example information on parameters, or normalization parameters, with which different functions need to be adjusted according to each accessory. The processor 340 is configured to read the data 365 and adjust the different functions accordingly. In a further example embodiment, the data 365 comprises information where the parameters can be retrieved, for example from a database on a server of the manufacturer of the first apparatus 300 or the accessory.

It shall be understood that any coupling in this document refers to functional or operational coupling; there may be intervening components or circuitries in between coupled elements unless expressly otherwise described.

The communication interface module 350 is configured to provide local communications over one or more local links. The links may be wired and/or wireless links. The communication interface 350 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 350 may be integrated into the first apparatus 300 or into an adapter or card that may be inserted into a suitable slot or port of the first apparatus 300. While FIG. 3 shows one communication interface 350, the apparatus may comprise a plurality of communication interface units 350. In a further example embodiment, the apparatus further 300 comprises a near field communication (NFC) unit. In an example embodiment, the communication interface unit may comprise a plurality of antennas, e.g. a separate antenna for each communications link and/or protocol used.

The processor 340 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 3 shows one processor 340, but the first apparatus 300 may comprise a plurality of processors.

Figure 4:
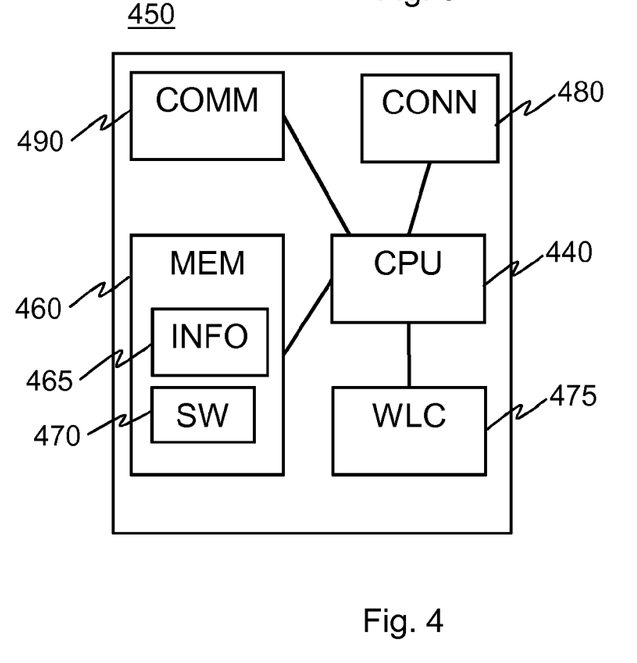
FIG. 4 shows a schematic block diagram of a second apparatus according to an example embodiment of the invention.

FIG. 4 shows a schematic a block diagram of a second apparatus 450 of an example embodiment. The second apparatus 450 is suited for operating as the second apparatus 150,250. The second apparatus 450 comprises a communication interface module 490, a processor 440 coupled to the communication interface module 490, and a memory 460 coupled to the processor 440. In an example embodiment, the apparatus comprises a wireless charging unit 475 coupled to the processor and comprising a wireless charging coil and a shielding element, e.g. a ferrite shield.

The apparatus further comprises coupled to the processor 440 a connection module or unit 480. In an example embodiment, the connection unit comprises mechanical, magnetic and/or electrical elements such as connectors, pads, pins or springs configured to attach or connect the second apparatus 450 to first apparatus 300, and configured to communicate therewith and/or to provide information on the orientation or configuration of the second apparatus 450 in relation to the first apparatus 300 when attached thereto. In an example embodiment, the connection module 480 further comprises an interface or a bus, such as a universal serial bus (USB). In a further example embodiment, the connection module 480 comprises an active or passive element configured to be detected by a suitable sensor or communications interface, e.g. radio frequency identification (RFID) tag, magnetic element, bar-code or a quick response (QR) code. In a further example embodiment, the second apparatus 450 is configured, in addition to or instead of the functionalities of the connection module, to communicate with the device 300 through the communication interface module 490.

In an example embodiment, in addition to the elements shown in FIG. 4, the second apparatus 450 may comprise other elements, such as microphones, displays, as well as additional circuitry such as a camera unit, further input/output (I/O) circuitries, memory chips, application-specific integrated circuits (ASIC), processing circuitry for specific purposes such as source coding/decoding circuitry, channel coding/decoding circuitry and ciphering/deciphering circuitry. Additionally, the second apparatus 450 may comprise a disposable or rechargeable battery (not shown) for powering the apparatus if external power supply is not available. Furthermore, the second apparatus 450, in a further example embodiment, comprises only some or none of the elements shown in FIG. 4. In a further example embodiment, the second apparatus 450 comprises only passive elements, for example only the mechanical structure thereof.

The memory 460 comprises a work memory and a non-volatile memory such as a read-only memory, flash memory, optical or magnetic memory. In the memory 460, typically at least initially in the non-volatile memory, there is stored software 470 operable to be loaded into and executed by the processor 440. The software 470 may comprise one or more software modules and can be in the form of a computer program product that is software stored in a memory medium. In an example embodiment, the memory 460 comprises data 465 concerning the second apparatus 450.

The communication interface module 490 is configured to provide local communications over one or more local links. The links may be wired and/or wireless links. The communication interface 490 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 490 may be integrated into the second apparatus 450 or into an adapter or card that may be inserted into a suitable slot or port of the second apparatus 450. While FIG. 4 shows one communication interface 490, the apparatus may comprise a plurality of communication interfaces 490. In a further example embodiment, the second apparatus 450 further comprises a near field communication (NFC) unit.

The processor 440 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 4 shows one processor 440, but the second apparatus 450 may comprise a plurality of processors.

As mentioned in the foregoing, any memory 360,460 may comprise non-transitory volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage or a smart card. In some example embodiments, only volatile or non-volatile memory is present in the first apparatus 300,450. Moreover, in some example embodiments, the apparatus comprises a plurality of memories. In some example embodiments, various elements are integrated. For instance, the memory 360,460 can be constructed as a part of the first apparatus 300,450 or inserted for example into a slot or a port. Further still, the memory 360,460 may serve the sole purpose of storing data, or it may be constructed as a part of an apparatus serving other purposes, such as processing data. Similar options are thinkable also for various other elements.

It is also useful to realize that the term apparatus is used in this document with varying scope. In some of the broader claims and examples, the apparatus may refer to only a subset of the features presented in FIGS. 3 and 4 or even be implemented without any one of the features of FIGS. 3 and 4. In an example embodiment term apparatus refers to the processor 340,440.

Figure 5:
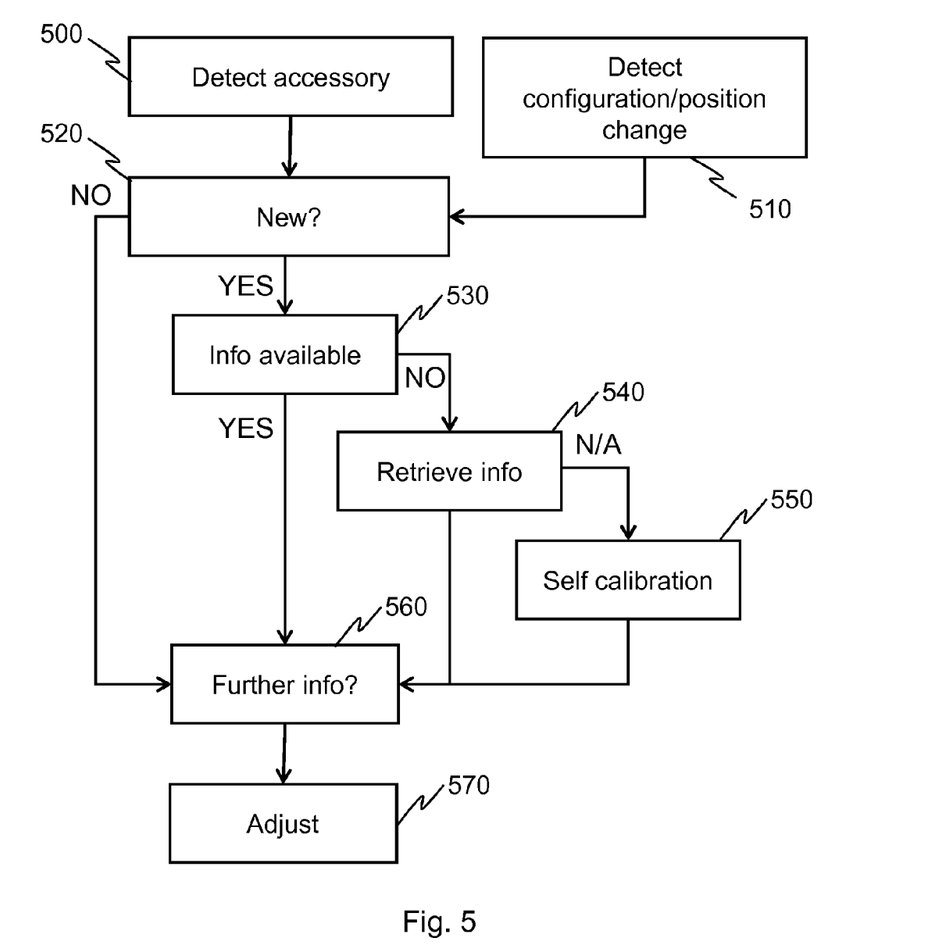
FIG. 5 shows a flow chart of a method according to an embodiment of the invention.

FIG. 5 shows a flow chart of a method according to an embodiment of the invention. At step 500 the processor 340 of the first apparatus 100, 200, 300 is configured to cause detecting an accessory, i.e. a second apparatus 150, 250, 450 attached thereto or in proximity thereof. In an example embodiment, the second apparatus 150, 250, 450 comprises a wireless charging unit 475. In an example embodiment the processor 340 of the first apparatus 100, 200, 300 is configured to cause the detecting the second apparatus 150, 250, 450 using the detection unit 320 through a physical or mechanical attachment, for example through pins, connectors, magnetic coupling or by detecting an element in the second apparatus 150, 250, 450. In a further example embodiment the processor 340 of the first apparatus 100, 200, 300 is configured to cause the detecting the second apparatus 150, 250, 450 through a wireless link, for example short range radio communications such as RFID or NFC, wireless local area network (WLAN) or Bluetooth. In a further example embodiment the processor 340 of the first apparatus 100, 200, 300 is configured to cause the detecting the second apparatus 150, 250, 450 prior to the second apparatus 150, 250, 450 being attached thereto, for example by reading a code on the second apparatus 150, 250, 450 or on a sales package thereof, or by imaging the second apparatus 150, 250, 450. In an example embodiment, a code is read using a camera unit of the first apparatus 100, 200, 300.

In a further example embodiment, the second apparatus 150, 250, 450, or the wireless charging unit 475 thereof comprises circuitry connected to the first apparatus 100, 200, 300 through one or more pins, and the processor 340 is configured to cause detecting the second apparatus 150, 250, 450 by detecting the presence of the circuitry using the detection unit 320 and by measuring electrically quantities or a change thereof caused by the circuitry, e.g. by measuring a changed rise time of a connecting pin or by measuring a DC-level from a connecting pin.

Alternatively or in addition to step 500, at step 510 the processor 340 of the first apparatus 100, 200, 300 is configured to cause detecting a change in the position or configuration of the accessory, i.e. a second apparatus 150, 250, 450. In an example embodiment, the second apparatus 150, 250, 450 comprises a wireless charging unit 475. For example when the accessory is adjusted to a different position, orientation or configuration as hereinbefore depicted with reference to FIGS. 2a-2d. In an example embodiment the processor 340 of the first apparatus 100, 200, 300 is configured to cause the detecting using the detection unit 320 the change of configuration, position or orientation through a physical or mechanical attachment, for example through pins, connectors, magnetic coupling or by detecting an element in the second apparatus 150, 250, 450. In a further example embodiment the processor 340 of the first apparatus 100, 200, 300 is configured to cause the detecting the second apparatus 150, 250, 450 through a wireless link, for example short range radio communications such as RFID or NFC, wireless local area network (WLAN) or Bluetooth, i.e. the second apparatus 150, 250, 450 communicates the change to the first apparatus 100, 200, 300. In a further example embodiment the processor 340 of the first apparatus 100, 200, 300 is configured to cause the detecting the change using further sensors, for example by detecting a change in lighting, by detecting the location of an element 165, 265 to be detected, or by imaging the second apparatus 150, 250, 450 with a camera unit 380. In a further example embodiment, the processor 340 of the first apparatus 100, 200, 300 is configured to cause the detecting the second apparatus 150, 250, 450 by detecting the mechanical structure thereof, for example by detecting an electrical quantity or a change in an electrical quantity such as capacitance or resistance.

At step 520 the processor 340 of the first apparatus 100, 200, 300 is configured to cause the determining whether the detected second apparatus 150, 250, 450 is new, i.e. whether the second apparatus 150, 250, 450 has been previously attached, used or paired with the first apparatus 100, 200, 300. If the second apparatus 150, 250, 450 has not been previously attached to the first apparatus 100, 200, 300. The processor 340 of the first apparatus 100, 200, 300 is configured to cause retrieving information on the second apparatus 150, 250, 450. In an example embodiment, the data 465 comprising information on the second apparatus 150, 250, 450 is retrieved from the memory 470 of the second apparatus 150, 250, 450. In a further example embodiment, the data 465 comprising information on where information on the second apparatus 150, 250, 450 can be retrieved is retrieved from the memory 470 of the second apparatus 150, 250, 450. The processor 340 of the first apparatus 100, 200, 300 is configured to cause retrieving the information from the memory 470 using a wired or wireless connection with the second apparatus 150, 250, 450. In a further example embodiment, the processor 440 of the second apparatus 150, 250, 450 is configures to send or provide the data 465 for the first apparatus 100, 200, 300 automatically or per request.

If no information on the second apparatus 150, 250, 450 is available either in the memory 470 or elsewhere, the processor 340 of the first apparatus 100, 200, 300 is configured to carry out a self-calibration using the detection unit 320 and/or measurement unit 335. The self-calibration determines information on the second apparatus 150, 250, 450 and determines parameters needed to adjust the functionalities of the first apparatus 100, 200, 300 when using the second apparatus 150, 250, 450.

At step 560, the processor 340 of the first apparatus 100, 200, 300 has caused the retrieving of the information concerning the second apparatus 150, 250, 450 or the information was already available in the memory 360 of the first apparatus 100, 200, 300. In an example embodiment the retrieved information is stored in the data 365 of the memory 360. The retrieved information comprises parameters needed to adjust the functionalities of the first apparatus 100, 200, 300 when using the second apparatus 150, 250, 450. In an example embodiment, at step 560, the processor 340 of the first apparatus 100, 200, 300 is configured to cause determining whether further or additional information is available in addition to the parameters retrieved. In an example embodiment, the processor 340 is configured to receive measurement data from the measurement unit 335 for example on the ambient conditions such as lighting, external magnetic fields, network connections or geographical location and/or to receive information on the type of use of the first apparatus 100, 200, 300. In an example embodiment, the processor 340 of the first apparatus 100, 200, 300 is configured to adjust the parameters concerning the second apparatus 150, 250, 450 in accordance with the measurement data where appropriate. In an example embodiment, for example use of wireless local area network requires in some cases a different kind of adjustment than the use of a mobile network, such as for example long term evolution LTE (network).

At step 570, the processor 340 of the first apparatus 100, 200, 300 is configured to adjust the functionalities of the first apparatus 100, 200, 300 in accordance with the available parameters, i.e. in response the second apparatus 150, 250, 450 being attached or used. An accessory, i.e. the second apparatus 150, 250, 450, and the wireless charging of an example embodiment may cause changes to the functioning of the first apparatus 100, 200, 300 or parts thereof. Accordingly, the parameters comprise information on adjustments to be carried out to normalize the functioning of the first apparatus 100, 200, 300 or parts thereof. In an example embodiment, a magnetometer of the first apparatus 100, 200, 300 is adjusted to avoid shifting of compass readings which shift could affect navigation-based application or functionalities. In a further example embodiment, the tuning of an antenna 355 is adjusted for improved reception independent of the used accessory. In a further example embodiment, the equalization of an integrated hands-free speaker of the first apparatus 100, 200, 300 is adjusted. In a still further example embodiment, further functionalities such as for example display parameters or user interface element functions are adjusted.

Some use cases relating to given example embodiments of the accessory are presented in the following. In a first use case, a user of a first apparatus 100, 200, 300, e.g. a smartphone, wishes to attach a cover with wireless charging functionality to the apparatus. The apparatus detects the attached cover and retrieves the parameters needed to adjust and carries out the adjustment of the antenna, magnetometer and the integrated hands free speaker of the apparatus in response to the cover being attached as the wireless charging coil and the ferrite shielding could otherwise cause disturbance or false readings.

In a second use case, a user of a first apparatus 100, 200, 300, e.g. a tablet computer, adjusts the position of the cover of her tablet computer to a position for optimal viewing of a movie. The apparatus detects the change of orientation of the cover and retrieves the parameters needed to adjust e.g. the antenna, magnetometer and the integrated hands free speaker of the apparatus in response to the changed orientation as the wireless charging coil and the ferrite shielding could otherwise cause disturbance or false readings. The parameters are further adjusted in order to provide the best possible user experience while viewing the movie, i.e. the display and speaker functionality is to be adjusted in accordance with ambient conditions such as lighting and use of headphones for audio. After parameter adjustment, the functionalities are adjusted.

In a third use case, a user of a first apparatus 100, 200, 300, e.g. a tablet computer, adjusts the position of the cover of her tablet computer from closed configuration to an open configuration. The apparatus detects the change of orientation of the cover and retrieves the parameters needed to adjust e.g. the antenna, magnetometer and the integrated hands free speaker of the apparatus in response to the changed orientation as the wireless charging coil and the ferrite shielding could otherwise cause disturbance or false readings. As the processor detects, based on location information and check-in at social media, that the tablet computer is used in an open network of a café, the parameters are further adjusted in order to provide the best possible user experience and security, i.e. the display and speaker functionality and network settings are to be adjusted. After parameter adjustment, the functionalities are adjusted.

In a fourth use case, a user of a first apparatus 100, 200, 300, e.g. a tablet computer, adjusts the position of the cover of her tablet computer to a position for optimal e-book reading, or attaches an accessory with integrated lighting thereto. The apparatus detects the change of orientation of the cover, or the further accessory, and retrieves the parameters needed to adjust e.g. the antenna, magnetometer and the integrated hands free speaker of the apparatus in response to the changed orientation as the wireless charging coil and the ferrite shielding could otherwise cause disturbance or false readings. The parameters are further adjusted in order to provide the best possible user experience for reading an e-book, i.e. the display functionality is to be adjusted in accordance with ambient lighting. After parameter adjustment, the functionalities are adjusted.

Without in any way limiting the scope, interpretation, or application of the claims appearing below, a technical effect of one or more of the example embodiments disclosed herein is that an apparatus can used with different accessories with no effect to the functionality thereof. Another technical effect of one or more of the example embodiments disclosed herein is to compensate the disturbances caused by an accessory providing wireless charging functionality. Another technical effect of one or more of the example embodiments disclosed herein is an enhanced and enjoyable user experience.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
a processor;
a non-transitory memory comprising computer program code, wherein the memory and the computer program code are configured, with the processor, to cause the apparatus to:
detect a second apparatus attached to the apparatus, wherein the second apparatus comprises at least a portion of a wireless charging unit which provides wireless charging functionality to the apparatus and is configured to provide a cover for at least a portion of the apparatus, and wherein the apparatus is an electronic device;
determine a parameter concerning the second apparatus; and
automatically adjust at least one functionality of the apparatus different than the wireless charging functionality based on the determined parameter to compensate for a change to the at least one functionality resulting from the attached second apparatus.

2. The apparatus of claim 1, wherein the apparatus further comprises a magnetometer; and the adjustment comprises adjusting the magnetometer.

3. The apparatus of claim 1, wherein the apparatus further comprises an antenna; and the adjustment comprises tuning the antenna.

4. The apparatus of claim 1, wherein the apparatus further comprises a speaker; and the adjustment comprises adjusting the speaker.

5. The apparatus of claim 1, wherein the detection comprises receiving the parameter from the second apparatus.

6. The apparatus of claim 1, wherein the detection comprises receiving measurement information from a measurement unit.

7. The apparatus of claim 1, wherein the detection comprises detecting an electrical quantity.

8. The apparatus of claim 1, wherein the detection comprises reading a code related to the second apparatus, wherein the code comprises at least one of: a barcode, RFID tag; and a QR code.

9. The apparatus of claim 1, wherein the determination comprises self-calibration.

10. The apparatus of claim 1, wherein the determination further comprises adjusting the parameter based on measurement data.

11. The apparatus of claim 1, wherein the electronic device is a mobile phone, a smartphone, a tablet computer or an e-book reader.

12. An apparatus comprising:
a memory; and
a wireless charging unit; wherein
said memory comprises a parameter concerning the apparatus; and
said apparatus is configured to be attached to a first apparatus according to claim 1.

13. The apparatus of claim 12, wherein the apparatus further comprises a connection unit configured to connect the apparatus to the first apparatus.

14. A method comprising:
detecting, by an electronic device, an apparatus attached to the electronic device, wherein the apparatus comprises at least a portion of a wireless charging unit which provides wireless charging functionality to the electronic device and is configured to provide a cover for at least a portion of the electronic device;
determining a parameter concerning the apparatus; and
automatically adjusting at least one functionality of the electronic device different than the wireless charging functionality based on the determined parameter to compensate for a change to the at least one functionality resulting from the attached apparatus.

15. The method of claim 14, wherein the adjusting comprises adjusting a magnetometer of the electronic device.

16. The method of claim 14, wherein the determining comprises self-calibration.

17. The method of claim 14, wherein the determining further comprises adjusting the parameter based on measurement data.

18. The method of claim 14, wherein the electronic device is a mobile phone, a smartphone, a tablet computer or an c-book reader.

19. The method of claim 14, further comprising attaching and/or pairing the apparatus to the electronic device.

20. A computer program product comprising computer code for causing performing the method of claim 14, when executed by an apparatus.

\* \* \* \* \*

UNITED STATES PATENT AND TRADEMARK OFFICE
CERTIFICATE OF CORRECTION

| | |
|---|---|
| PATENT NO. | : 9,560,183 B2 |
| APPLICATION NO. | : 14/767940 |
| DATED | : January 31, 2017 |
| INVENTOR(S) | : Juhani Kari et al. |

It is certified that error appears in the above-identified patent and that said Letters Patent is hereby corrected as shown below:

In Claim 18:

Column 12, Line 67, "c-book" should be deleted and -- e-book -- should be inserted.

Signed and Sealed this
Eighteenth Day of April, 2017

Michelle K. Lee
*Director of the United States Patent and Trademark Office*